United States Patent Office.

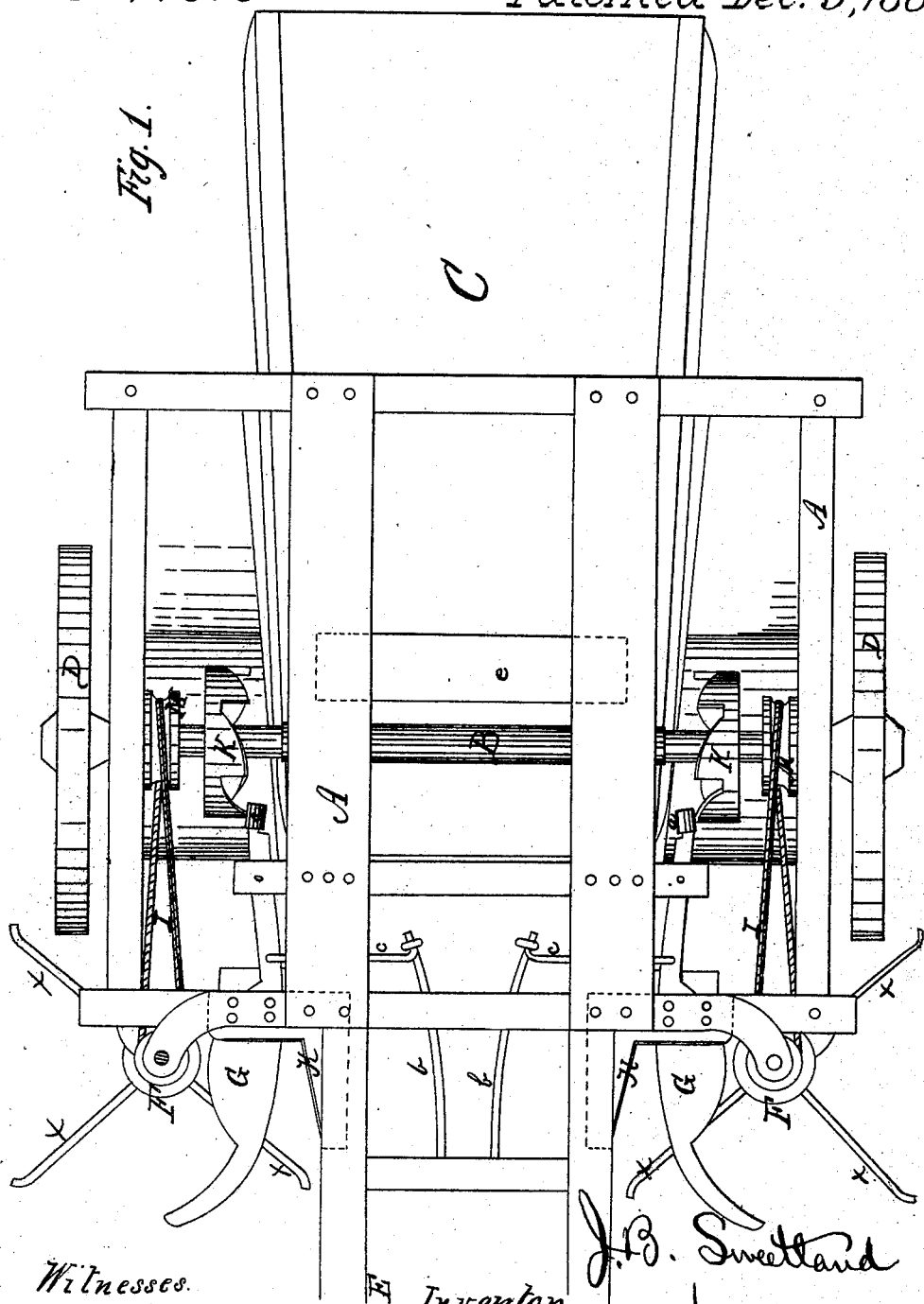

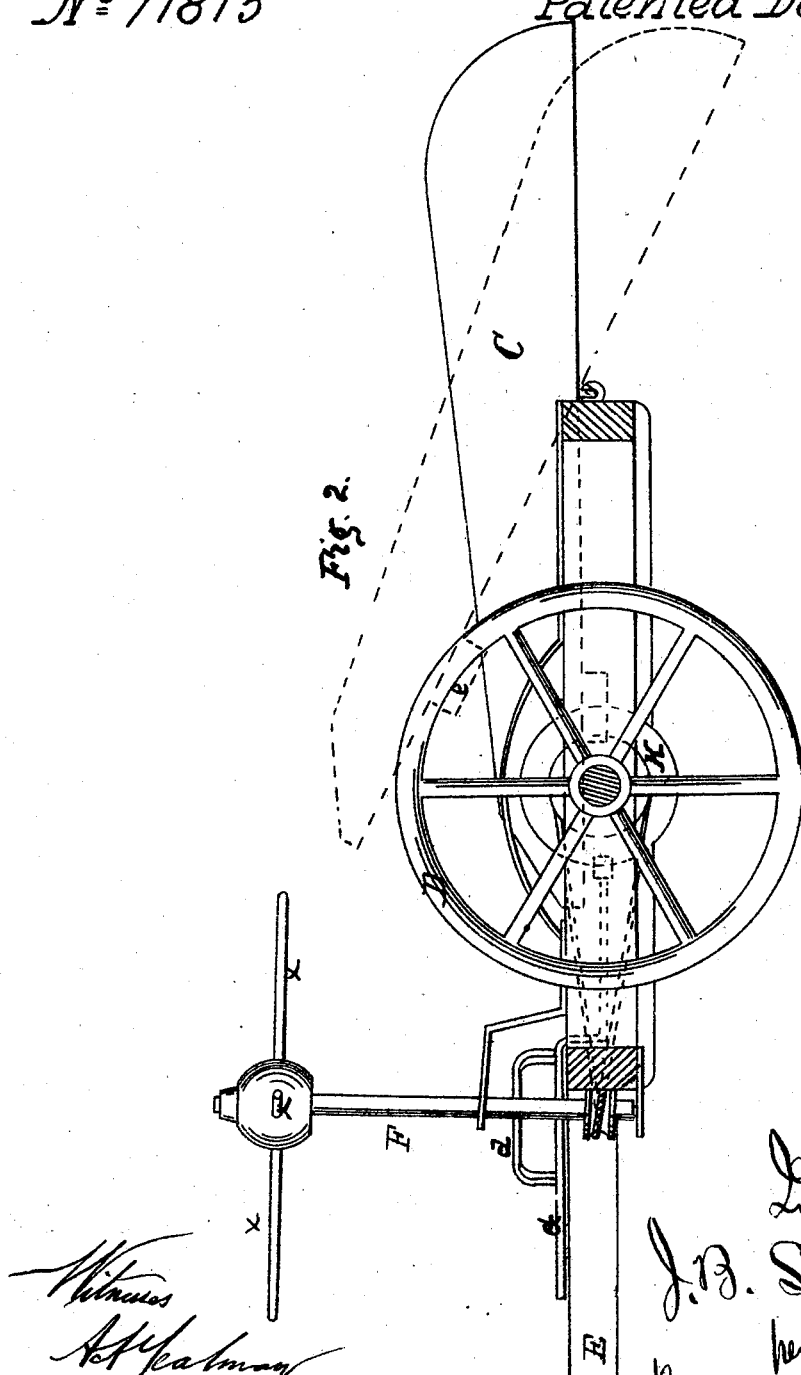

J. B. SWEETLAND, OF PONTIAC, MICHIGAN.

Letters Patent No. 71,815, dated December 3, 1867.

IMPROVEMENT IN CORN-HARVESTERS.

The Schedule referred to in these Letters Patent and making part of the same.

TO ALL WHOM IT MAY CONCERN:

Be it known that I, J. B. SWEETLAND, of Pontiac, in the county of Oakland, and in the State of Michigan, have invented certain new and useful Improvements in "Corn-Harvesters;" and do hereby declare that the following is a full, clear, and exact description thereof, reference being had to the annexed drawings, and the letters of reference marked thereon, making a part of this specification, in which—

Figure 1 represents an inverted plan view, and

Figure 2 a side elevation.

In the accompanying drawings, A represents a suitable frame, through which passes the axle B, which axle has suitable wheels, D D, at its extremities. Within the frame A, upon the axle, and near each wheel D D, is a ratchet-wheel, K, and also a stationary pulley, M. G G represent two eccentric-shaped knives, which lie horizontally each side of the wagon-tongue or shafts E. These knives are so constructed as to form guides at the forward ends, and bent with their rear ends under the frame. $a\ a$ are small metal rollers at the end of each knife, which rest directly against the corrugations of the ratchets K K. $b\ b$ represent springs, which are secured to the frame, and to which are attached the rods $c\ c$, connecting with the knives G G. These springs may be made of any peculiar shape or construction, and are to throw the knives back to their original place after being distended, as will hereafter be shown. Directly beneath each knife G is an L-shaped stationary knife, H, which rests upon the frame and shafts. F F represent two reels, which are placed in an upright position at each side of the knives G G. These reels are each made with an upright post, with a series of arms, $x\ x$, at the top, for sweeping the corn-stalks upon the harvester-bed. It will be seen that the reel-posts F F are provided with small pulleys at their lower ends, from which extends a cord, belt, or other suitable device, I, to the pulleys M M upon the axle. C represents the dumping-box or platform, on to which the corn is thrown by the arms of the reels. This box is hinged to the rear end of frame A, and has a weight, $e$, under its forward end, to drop it to its normal condition after dumping the corn. $d$ is a guide upon each knife G, to carry the corn to the rear, and prevent it from falling to the ground after cutting.

The harvester is driven between the rows, so that the ends of the knives G G catch the stalks. The axle being revolved, with its pulleys and ratchets, forces the knives outwards, and the springs $b\ b$ and rods $c\ c$ carry them back, cutting the corn, and the reels and guides dropping it upon the dumping-box, where it is bundled and dumped off.

Having thus fully described my invention, what I claim as new, and desire to secure by Letters Patent, is—

1. The frame A, with axle B, ratchets K K, and pulleys M M, arranged for operating the spring-knives G G and reels F F, in the manner and for the purposes set forth.

2. The knives G G, in combination with the L-shaped knives H H, reels F F, guides $d$, and springs $b\ b$, or their equivalents, all constructed, arranged, and operating substantially as and for the purposes herein set forth.

In testimony that I claim the foregoing, I have hereunto set my hand, this     day of     , 1866.

J. B. SWEETLAND.

Witnesses:
J. S. DEWEY,
E. F. DEWEY.